US008554945B1

(12) United States Patent
Cook et al.

(10) Patent No.: US 8,554,945 B1
(45) Date of Patent: Oct. 8, 2013

(54) CELLULAR EXTENSION OF WIRELESS LOCAL AREA NETWORKS

(75) Inventors: Fred S. Cook, Olathe, KS (US); Durga P. Satapathy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2625 days.

(21) Appl. No.: 10/652,284

(22) Filed: Aug. 29, 2003

(51) Int. Cl.
G06F 15/173 (2006.01)

(52) U.S. Cl.
USPC .......................................... 709/238; 370/401

(58) Field of Classification Search
USPC .......................................... 709/238; 370/401
See application file for complete search history.

(56) References Cited

U.S. PATENT DOCUMENTS

| | | | |
|---|---|---|---|
| 5,491,695 A | 2/1996 | Meagher et al. | |
| 5,796,727 A * | 8/1998 | Harrison et al. | 370/338 |
| 6,230,005 B1 | 5/2001 | Le et al. | |
| 6,272,120 B1 * | 8/2001 | Alexander | 370/338 |
| 6,405,030 B1 | 6/2002 | Suprunov | |
| 6,657,981 B1 * | 12/2003 | Lee et al. | 370/331 |
| 7,046,998 B2 * | 5/2006 | Verma et al. | 455/418 |
| 7,050,452 B2 * | 5/2006 | Sugar et al. | 370/465 |
| 7,095,748 B2 * | 8/2006 | Vij et al. | 370/401 |
| 7,155,526 B2 * | 12/2006 | Chaudhary et al. | 709/229 |
| 7,340,247 B1 * | 3/2008 | O'Hara et al. | 455/418 |
| 7,376,091 B1 * | 5/2008 | Eccles et al. | 370/265 |
| 7,583,632 B2 * | 9/2009 | Janevski et al. | 370/331 |
| 7,634,230 B2 * | 12/2009 | Ji et al. | 455/41.2 |
| 2001/0041596 A1 * | 11/2001 | Forlenzo et al. | 455/566 |
| 2002/0143960 A1 | 10/2002 | Goren et al. | |
| 2003/0051041 A1 | 3/2003 | Kalavade et al. | |
| 2003/0055959 A1 * | 3/2003 | Sato | 709/224 |
| 2003/0112810 A1 * | 6/2003 | Nakabayashi et al. | 370/401 |
| 2003/0163579 A1 * | 8/2003 | Knauerhase et al. | 709/230 |
| 2004/0066757 A1 * | 4/2004 | Molteni et al. | 370/329 |
| 2004/0072593 A1 * | 4/2004 | Robbins et al. | 455/560 |
| 2004/0109472 A1 * | 6/2004 | Choyi et al. | 370/466 |
| 2004/0125812 A1 * | 7/2004 | Kao et al. | 370/401 |
| 2004/0127204 A1 * | 7/2004 | Belmont | 455/418 |
| 2004/0128123 A1 * | 7/2004 | Kashiwagi | 704/201 |
| 2004/0184466 A1 * | 9/2004 | Chang et al. | 370/401 |
| 2004/0267874 A1 * | 12/2004 | Westberg et al. | 709/200 |

FOREIGN PATENT DOCUMENTS

WO 00/33518 6/2000

OTHER PUBLICATIONS

Motorola, Inc. *Technical Overview of 1xEV-DV*, Sep. 6, 2002, pp. 1-24.
H. Keith Smith, *Comparing Digital Cellular Technologies for Wide-Area Internet Access*, Jul. 1998, pp. 1-10.
Ahmed et al., *Simulation of TCP/IP Applications on a CDPD Chanel*, Feb. 2001, pp. 1-54.
Langer et al., *CDMA2000—A World View*, 2001, pp. 150-158.

* cited by examiner

*Primary Examiner* — Duyen Doan

(57) ABSTRACT

A wireless local area network (WLAN) is linked with a remote LAN to transport data packets therebetween. The WLAN includes a cellular-enabled WLAN device for communicating with a cellular network and the cellular network includes a bridge. A bridge identifier associated with the bridge is established within the cellular network. The cellular-enabled WLAN device and the remote LAN are interconnected with the bridge in response to the cellular-enabled device signaling the cellular network with the bridge identifier. The cellular-enabled WLAN device echoes WLAN network packets originating in the WLAN to the bridge. The remote LAN receives the echoed WLAN network packets from the bridge. Packets originating in the remote LAN are echoed by the bridge to the cellular-enabled WLAN device. The cellular-enabled WLAN device receives the echoed remote LAN network packets from the bridge and transmits them within the WLAN.

19 Claims, 4 Drawing Sheets

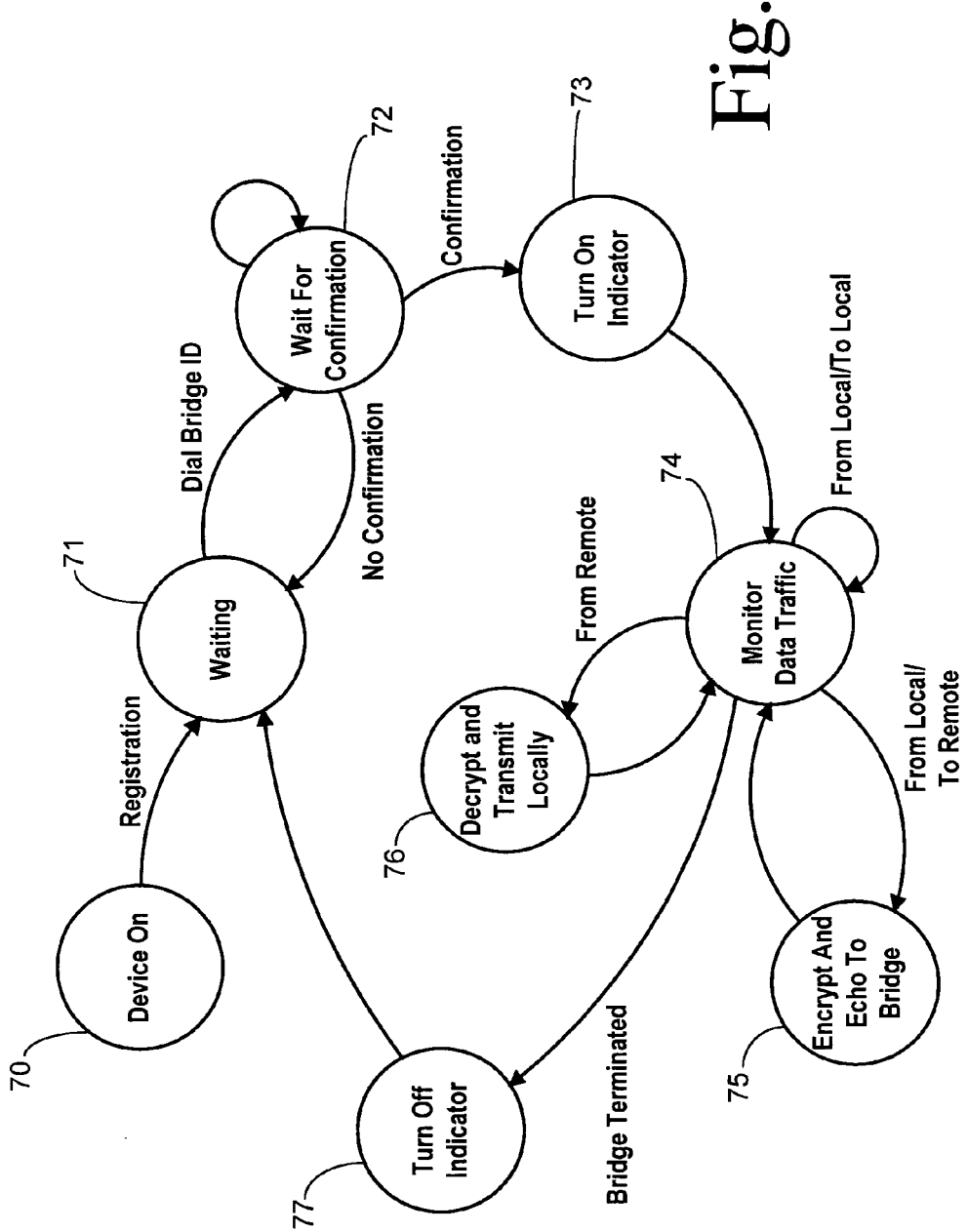

CELLULAR EXTENSION OF WIRELESS LOCAL AREA NETWORKS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to wireless data networking, and, more specifically, to interconnecting a wireless local area network (WLAN) to other remote local area networks.

Mobile wireless LAN devices have become popular using the IEEE 802.11 standard. WLANs provide data networking among mobile devices (e.g., laptop computers, personal digital assistants, and "smart" cellular phones) and between mobile devices and fixed devices. The range of wireless links in a WLAN, however, is typically very limited (e.g., no more than 300 meters in an IEEE 802.11b network). Thus, when a mobile user strays outside this range, their data connectivity with the WLAN is lost.

A WLAN may provide data connectivity within a business or a home office, for example, so that mobile users can access network hardware, e.g., a printer or a gateway to fixed IP networks such as the Internet. When a user moves outside the range of the WLAN, then the printer and the gateway become unavailable. It would be desirable to provide an alternative connection so that the user can restore access to the resources while out of range. It may also be desirable to share WLAN connected resources when mobile users in a group of common interest (e.g., a business or enterprise group) are spread too far apart to use an IEEE 802.11 network. In the prior art, geographically separated WLANs have been interconnected by dedicated landline links. In many potential applications, however, a fixed, landline network is impractical or too expensive.

Wireless data networking has also become available using wide area networks, such as a cellular telephone system. Cellular data modems have been integrated with cellular telephones to provide data services such as web browsing and text messaging. The general packet radio service (GPRS) standard has been defined for facilitating access to IP networks by mobile cellular devices. In the existing services, however, the mobile user is limited to using pre-configured remote applications or browsing to fixed IP resources.

In order to take advantage of developments in IP telephony, dual mode WLAN/WAN telephone devices have become available. When within range of a wireless LAN, the dual mode phone may use a WLAN interconnection to complete telephone voice calls and to conduct data sessions via an IP network. When outside the range of the WLAN, the WAN cellular transceiver is used to complete voice calls or to access data services as described above. The WLAN and WAN portions of the device separately provide point-to-point communications for the user and have not been capable of sharing resources of a WLAN.

SUMMARY OF THE INVENTION

The present invention has the advantage of creating generic LAN to LAN connections via a cellular system acting as intermediary.

In one aspect of the invention, a method is provided for interfacing a first local area network (LAN) with a remote LAN, wherein the first LAN includes a cellular-enabled LAN device for communicating with a cellular network, and wherein the cellular network includes a bridge. A bridge identifier associated with the bridge is established within the cellular network. The cellular-enabled LAN device and the remote LAN are interconnected with the bridge in response to the cellular-enabled device signaling the cellular network with the bridge identifier. The cellular-enabled LAN device echoes first LAN network packets originating in the first LAN to the bridge. The remote LAN receives the echoed first LAN network packets from the bridge. Packets originating in the remote LAN are echoed by the bridge to the cellular-enabled LAN device. The cellular-enabled LAN device receives the echoed remote LAN network packets from the bridge and transmits them within the first LAN.

BRIEF DESCRIPTION OF THE DRAWINGS

FIG. 5 is a state diagram showing a preferred method of operation of the mobile transceiver.

DETAILED DESCRIPTION OF PREFERRED EMBODIMENTS

The present invention provides a mechanism for transporting wireless LAN data traffic between remote LANs via a cellular link. The process begins with the selection of a LAN bridging identifier. The identifier may be selected by the originating requester or preferably by the cellular service provider. The originating requester records the identifier as the "router" or "bridge" location in the memory of their cellular device. When ready to bridge data traffic with another LAN, the requester activates the bridge by dialing the "bridge" identifier to establish the connection. The service provider "bridge" sends an acknowledgement of the requested connection back to the cellular device and prompts the user to complete the bridge by confirming the setup (e.g., through a key sequence or a specially defined key).

When the bridge is active, the cellular device generates a reminder that wireless LAN activity is being bridged in the form of a status signal on the cellular device (e.g., an LED or other light on the device or a text display). The cellular device is either set to echo everything it "sees" on the wireless LAN to the cellular link and everything that it "sees" on the cellular link to the wireless LAN, or may be set to transmit specific communications to and from the wireless LAN to the cellular link. When other LANs associate to the bridge, the bridge controller may set up virtual private network (VPN) links to interconnect all the associated endpoints.

When no longer needed, the bridge can be removed by the originator using a predetermined key sequence or a specially defined key. The bridge controller notifies all the other endpoints that the bridge is being removed and the VPN links are released.

Although the invention is described in connection with the cellular device being part of a wireless LAN, it may also be used with a wired LAN or a combination wired and wireless LAN.

Figure 1:
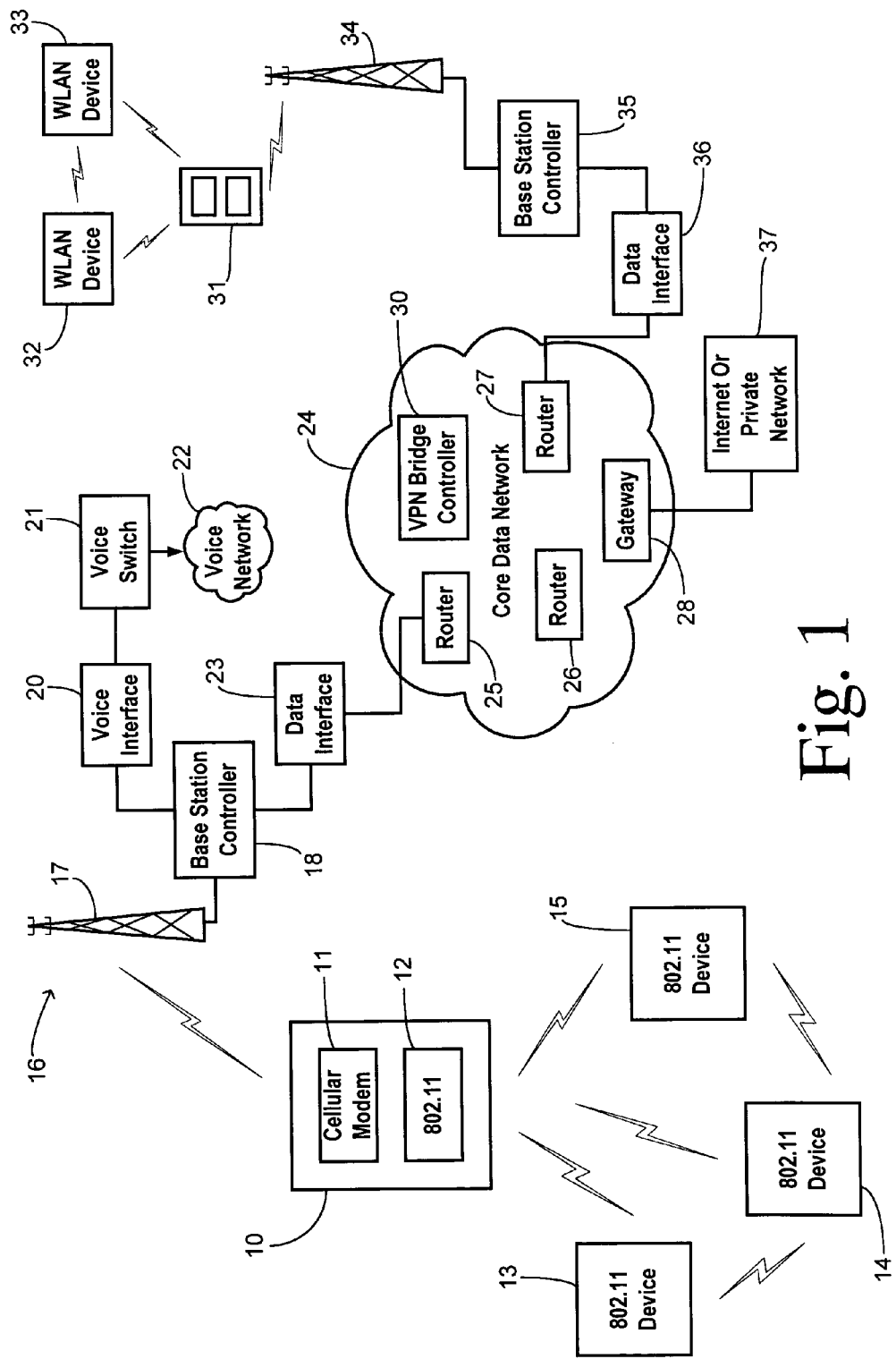
FIG. 1 is a block diagram showing one preferred network architecture for implementing the present invention.

Referring now to FIG. 1, a cellular-enabled WLAN device 10 includes a cellular modem 11 and a wireless networking node 12 (e.g., an IEEE 802.11-compliant device). Node 12 functions as a hub in a wireless LAN which also includes a plurality of 802.11 devices 13, 14, and 15. WLAN data packets being transmitted in the WLAN can be selectively echoed to a WAN cellular system 16 via cellular modem 11. Cellular system 16 includes a cellular tower antenna 17 coupled to a conventional base station controller 18. Any digital cellular service can be employed, such as a PCS system or a GSM system. Cellular signals received at base station controller 18 are split into a voice stream and a packet data stream. The splitting may occur at a mobile switching office (not shown). The voice stream is coupled from a voice interface 20 to a voice switch 21 which completes voice calls via a voice network 22 (such as the public switched telephone network). The packet data stream is directed via a data interface 23 to a router 25 in a core data network 24. Core data network 24 may preferably comprise an IP packet-based network including routers 25-27, an IP gateway 28, and a VPN bridge controller 30. IP gateway 28 is coupled to an external, fixed network 37 such as the Internet or a private network.

A remote WLAN includes a cellular-enabled WLAN device 31 and 802.11 to WLAN devices 32 and 33. The present invention provides for transmission of data packets between the two remotely located LANs through cellular system 16. Cellular-enabled WLAN device 31 exchanges cellular signals with a base station controller 35 via a cellular antenna tower 34. A data stream received by base station controller 35 is coupled via a data interface 36 to a router 27 in core data network 24.

VPN bridge controller 30 stores a plurality of bridge identifiers for creating respective links between endpoints that request connection according to each particular bridge identifier (i.e., when they associate to a bridge identifier). Thus, a private network overlay is created within core data network 24 and the wireless cellular system for exchanging data packets between the originating WLAN device and any other devices or locations that subsequently request associated with the active bridge identifier. While the cellular-enabled WLAN device acts as a hub for bridging traffic between the WLAN and the cellular system, it preferably includes additional capabilities not usually associated with a basic hub. Specifically, the cellular-enabled WLAN device is preferably an intelligent hub with routing/switching/filtering intelligence which can be implemented using a variety of known technologies.

Figure 2:
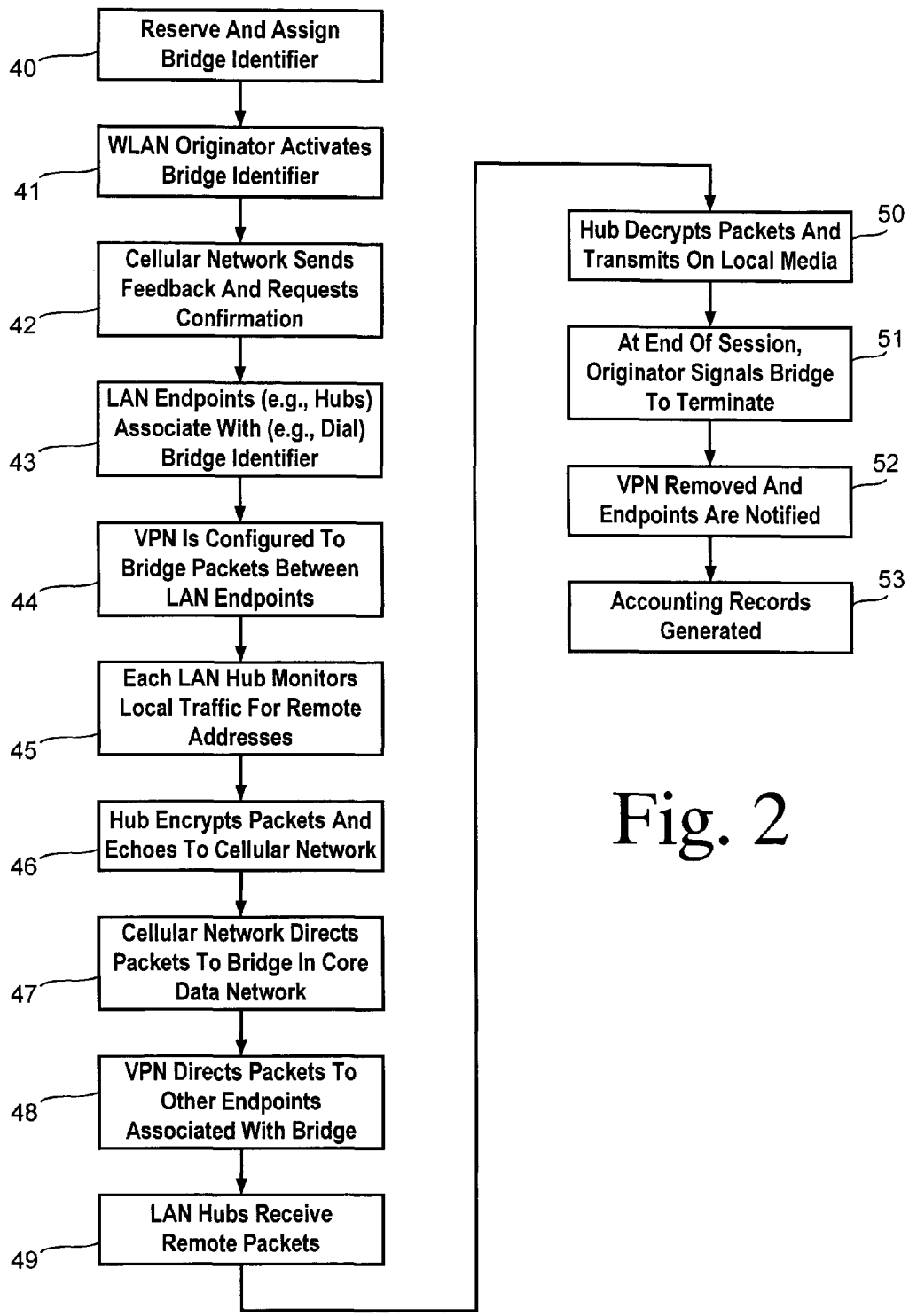
FIG. 2 is a flowchart showing a preferred method of the present invention.

A detailed method of the invention is shown in FIG. 2. In step 40, a bridge identifier is reserved and assigned to a particular user or group of users of the cellular system (e.g., who may be financially responsible for costs associated with use of a bridge). The bridge identifier may for example comprise a multi-digit number resembling a telephone number. Prior to or during use, the bridge identifier is communicated to the assigned user and, in turn, to other potential users of the bridge. In step 41, an originator (i.e., the assigned user or other user given authorization by the assigned user) in the WLAN seeking to exchange data packets with a remote LAN contacts the cellular system and activates the bridge identifier. The request for activation may comprise the dialing of a bridge identifier number or generation of other control signals using the originator's cellular-enabled WLAN device. When a bridge identifier is active, a bridge is set up for accepting requests from various endpoints to participate in the sharing of data traffic. The assigned user and/or originator may be charged for bridge usage according to the time of activation, for example.

In step 42, the cellular network (e.g., the bridge controller) sends a feedback message to acknowledge the requested activation and to prompt for confirmation of the set up. For example, a bridge identifier may have corresponding adjustable parameters, such as number and/or type of endpoints, that may be modified during activation. The originator makes any desired changes (using a predetermined key sequence or special purpose keys) and supplies confirmation to the cellular network. The originator's cellular-enabled WLAN device may immediately begin to forward traffic from the WLAN to the bridge. If no other endpoints are yet associated with the bridge, then the core data network merely discards the traffic.

In step 43, additional LAN endpoints (e.g., intelligent hubs of other remote LANs) associate with the activated bridge identifier. Association requests may be generated by dialing the bridge identifier number from another cellular-enabled WLAN device or otherwise providing the bridge identifier as part of a request transmitted to the bridge controller (e.g., via data interface 36 for the user of WLAN device 31 or via gateway 28 from a fixed LAN). Acceptance of a request for associating with a bridge identifier can be conditioned upon proper authentication and authorization using conventional techniques. In an alternative embodiment, endpoints to be included in a bridge may be pre-configured and automatically included when the bridge is activated.

A virtual private network (VPN) is configured (and subsequently re-configured if necessary) in step 44. Thus, dedicated links within core data network 24 and cellular channels within cellular system 16 are set up for transmitting data packets between the associated endpoints. More specifically, each LAN or WLAN hub monitors its local traffic in step 45. In a preferred embodiment, not all traffic is bridged. To preserve bandwidth in the wireless cellular links, only traffic with a destination address not contained in the local network is echoed to the bridge. Therefore, each intelligent hub looks for data packets containing remote addresses. In step 46, the detected packets are optionally encrypted and then echoed to the cellular network. The cellular network forwards the packets to the bridge in the core data network in step 47.

In step 48, the VPN corresponding to the bridge identifier directs the echoed data packets to the other LAN endpoints associated with the bridge. In one embodiment, all packets received by the bridge may be broadcast to all of the endpoints (other than the sending endpoint) associated with the bridge. Alternatively, the destination addresses could be examined and directed appropriately (assuming the bridge had information identifying address ranges present at each endpoint). Packets from remote LANs are received by each particular LAN hub in step 49. In step 50, the hub decrypts the packets and then transmits them on its local media (e.g., a local 802.11 channel). If desired, a switching hub can first inspect the destination addresses of remote packets and discard those for which the destination address is not a local address.

When a bridge session is no longer needed, the originator signals the bridge to terminate in step 51. The VPN links are removed in step 52 and the LAN endpoints are notified of the termination. In step 53, accounting records are generated in order to properly charge the assigned user and/or originator according to the usage of the bridge (e.g., the charges may be included in a billing associated with a cellular telephone account).

Figure 3:
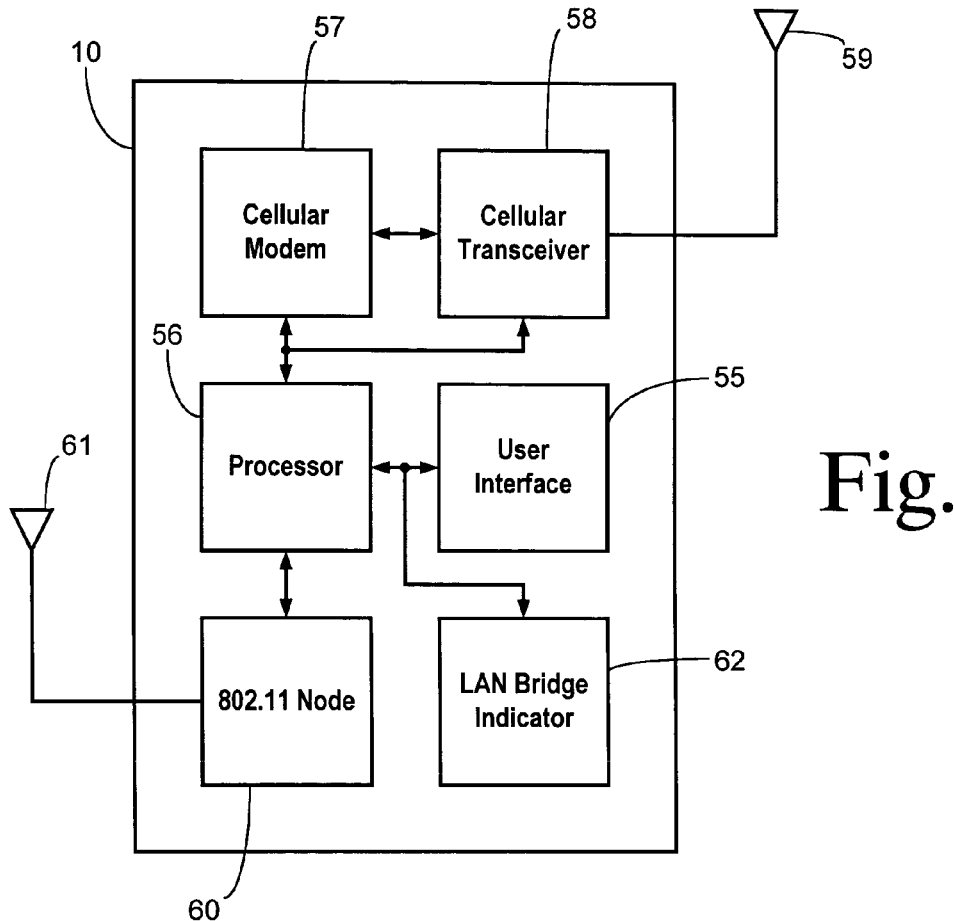
FIG. 3 is a block diagram showing a preferred embodiment of a mobile transceiver.

FIG. 3 shows a preferred embodiment of cellular-enabled WLAN device 10 in greater detail. A user interface 55 is coupled to a main processor 56. User interface 55 preferably includes input/output elements for conducting both voice calls and data sessions, although a dedicated data device supporting only data sessions is also contemplated. Processor 56 is coupled to a cellular modem 57 and to a cellular transceiver 58 connected to a cellular antenna 59. Processor 56 supports input/output signal processing as well as supervisory control functions. It is also coupled to a WLAN node 60 connected to a WLAN antenna 61. A LAN bridge indicator 62 coupled to processor 56 may comprise an indicator light or icon on a text display so that a visual inspection of device 10 can determine whether a bridge has been activated.

Figure 4:
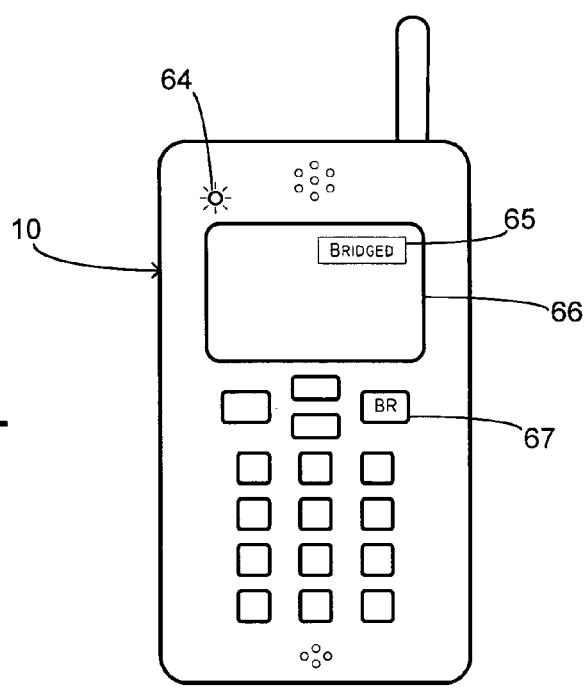
FIG. 4 is a front, plan view of a mobile transceiver according to the present invention.

FIG. 4 shows an integrated cellular phone/WLAN intelligent hub with a bridge indicator light 64 and a bridge icon 65 on a display 66. Control push buttons of the user interface include a dedicated bridge key 67 for activating bridging commands.

FIG. 5 shows the operation of an integrated phone/WLAN device. In state 70, the device is turned on and is initialized in a conventional manner. If a cellular service is found by the device, then it registers with the cellular base station and proceeds to a bridge wait state 71. While in wait state 71, the device may perform other functions related to conducting voice calls, non-bridged data calls, and/or WLAN functions. When the user desires a bridged connection, then a bridge identifier is dialed and the device proceeds to a state 72 to wait for confirmation that the bridge is active. If no confirmation is received within a predetermined period of time, then a return is made to wait state 71.

When confirmation of an active bridge is received (e.g., in the form of a status signal from the bridge controller), then the bridge indicator is turned on by the device in state 73. The device immediately transitions to state 74 wherein it monitors the data traffic seen on the local WLAN and on the cellular link. When data packets are seen on the local port of the switching hub that have a local destination address, then no action is taken in state 74. If data packets are seen on the local port that have non-local destination addresses, then a transition is made to state 75 wherein the packets are echoed to the bridge. Optionally, the packets may first be encrypted is any conventional manner. After echoing the packets, the device continues to monitor data traffic in state 74.

If remote data packets are seen on the port coupled to the cellular system, then the device transitions to state 76 wherein the packets are transmitted on the local port by the intelligent hub. If encrypted, the packets are first decrypted in a conventional manner. After echoing the packets, the device continues to monitor data traffic in state 74.

To deactivate the bridge, the user generates a termination signal which causes the device to turn off the bridge indicator in state 77. The device then returns to state 71 to await any further bridge activation.

What is claimed is:

1. A method of interfacing a first local area network (LAN) with a remote LAN, wherein said first LAN includes a cellular-enabled LAN device for communicating with a cellular network, and wherein said cellular network includes a core data network including a bridge, said method comprising the steps of:
    establishing a bridge identifier to identify said bridge within said core data network within said cellular network;
    said cellular-enabled LAN device originating a call to said bridge by dialing said bridge identifier;
    interconnecting said remote LAN with said bridge in response to said bridge identifier;
    said cellular-enabled LAN device monitoring destination addresses in first LAN network packets originating in said first LAN and echoing to said bridge only first LAN network packets having a destination address outside said first LAN;
    said remote LAN receiving said echoed first LAN network packets from said bridge;
    echoing remote LAN network packets originating in said remote LAN from said bridge to said cellular-enabled LAN device; and
    said cellular-enabled LAN device receiving said echoed remote LAN network packets from said bridge and transmitting them within said first LAN.

2. The method of claim 1 wherein said cellular-enabled LAN device comprises a switching hub for echoing LAN packets to said bridge.

3. The method of claim 1 wherein said first LAN comprises a wireless LAN.

4. The method of claim 1 wherein said remote LAN comprises a wireless LAN.

5. The method of claim 1 wherein said cellular network includes a packet-switched core data network, said method further comprising the step of:
    establishing a virtual private network within said core data network corresponding to said bridge identifier.

6. The method of claim 5 wherein said virtual private network is established in response to activation of said bridge by an originating caller to said cellular network from said first LAN using said cellular-enabled LAN device.

7. The method of claim 6 further comprising the step of:
    said core data network obtaining confirmation of a VPN set-up from said originating caller prior to establishing said virtual private network.

8. The method of claim 6 further comprising the step of:
    generating a visual indication on said cellular-enabled LAN device when said virtual private network is activated.

9. The method of claim 6 further comprising the steps of:
    said remote LAN associating to said bridge identifier via a respective call within said cellular network; and
    configuring said virtual private network to route network packets between said first LAN and said remote LAN.

10. The method of claim 9 further comprising the step of:
    configuring said virtual private network to route network packets between said first LAN and a fixed IP gateway.

11. The method of claim 6 further comprising the steps of:
    said originating caller signaling said cellular network to terminate said bridge;
    removing said configured routing of said virtual private network; and
    notifying said remote LAN of said termination.

12. The method of claim 1 further comprising the step of:
    encrypting said first LAN network packets prior to echoing to said bridge.

13. Network apparatus comprising:
    a cellular system for wirelessly exchanging data with mobile transceivers; and
    a core data network having a plurality of data interfaces for exchanging data packets with said cellular system, wherein said core data network includes a bridge controller for establishing routes for data packets corresponding to respective bridge identifiers when requested by at least one of said mobile transceivers;

wherein said cellular system is configured to receive a call from a plurality of cellular-enabled LAN devices to associate with a respective one of said bridge identifiers, and wherein said core data network is configured to echo data packets received from one of the cellular-enabled LAN devices to other cellular-enabled LAN devices associated with said respective bridge identifier.

14. The network apparatus of claim 13 wherein said established routes are each comprised of a virtual private network set up by said bridge controller to interconnect mobile transceivers associating to a respective bridge identifier.

15. The network apparatus of claim 14 wherein said core data network further comprises an IP gateway and wherein said virtual private network includes a link to an IP address via said IP gateway.

16. The network apparatus of claim 13 wherein said bridge controller transmits a status signal to said interconnected mobile transceivers.

17. An integrated cellular phone and wireless local area network (WLAN) portable device for interconnecting with a remote LAN via a cellular network, wherein said cellular network includes a core data network, comprising:
   a WLAN node for exchanging local data packets within a wireless LAN;
   voice apparatus for separately conducting a voice call within said cellular network;
   a cellular modem for exchanging remote data packets with said cellular network;
   a user interface including a predetermined key for initiating a bridge request;
   a processor coupled to said WLAN node and said cellular modem for requesting a bridge within said core data network to a remote LAN by transmitting a bridge identifier to said cellular network in response to activation of said predetermined key and for causing at least a portion of said local data packets to be forwarded to said bridge via said cellular modem; and
   a LAN bridge indicator for generating a visual display when said bridge is active.

18. The integrated cellular phone and WLAN device of claim 17 wherein said processor comprises a switching hub for selectively forwarding to said bridge only local data packets addressed to a destination outside said wireless LAN.

19. The integrated cellular phone and WLAN device of claim 17 wherein remote data packets received from said cellular system are transmitted as local data packets by said WLAN node.

* * * * *